United States Patent

[11] 3,547,294

| [72] | Inventor | Beverly E. Williams<br>La Grange Park, Ill. (P.O. Box 299, San Mateo, CA 94401) |
|---|---|---|
| [21] | Appl. No. | 754,396 |
| [22] | Filed | Aug. 21, 1968 |
| [45] | Patented | Dec. 15, 1970 |

[54] COATED PLASTIC CONTAINERS
8 Claims, 6 Drawing Figs.

[52] U.S. Cl. ........................................... 215/1;
117/72, 117/138.8; 215/12; 264/129
[51] Int. Cl. ...................................... B65d 23/02,
B65d 23/08
[50] Field of Search .................................... 117/94, 95,
96, 71, 72, 138.8E; 215/1.5, 12, 13; 220/64, 9D, 9C

[56] References Cited
UNITED STATES PATENTS

| 2,285,614 | 6/1942 | Rodgers | 215/12 |
| 2,643,021 | 6/1953 | Freedman | 220/9 |
| 2,985,542 | 5/1961 | Pinsky | 215/1X |
| 3,048,294 | 8/1962 | Osborn | 215/13 |
| 3,308,997 | 3/1967 | Kelly | 215/1UX |
| 3,393,087 | 7/1968 | Kamp | 117/95X |

*Primary Examiner*—Donald F. Norton
*Attorney*—Johnson, Dienner, Enrich, Verbeck & Wagner

ABSTRACT: A blow-molded plastic bottle or jug having an impervious coating thickness of metal united to one surface thereof to seal in the flavors of liquid stored in the bottles or to protect the same against the deleterious effects of ultraviolet light or other radiations and covered by a thin continuous coating of nontoxic synthetic resin.

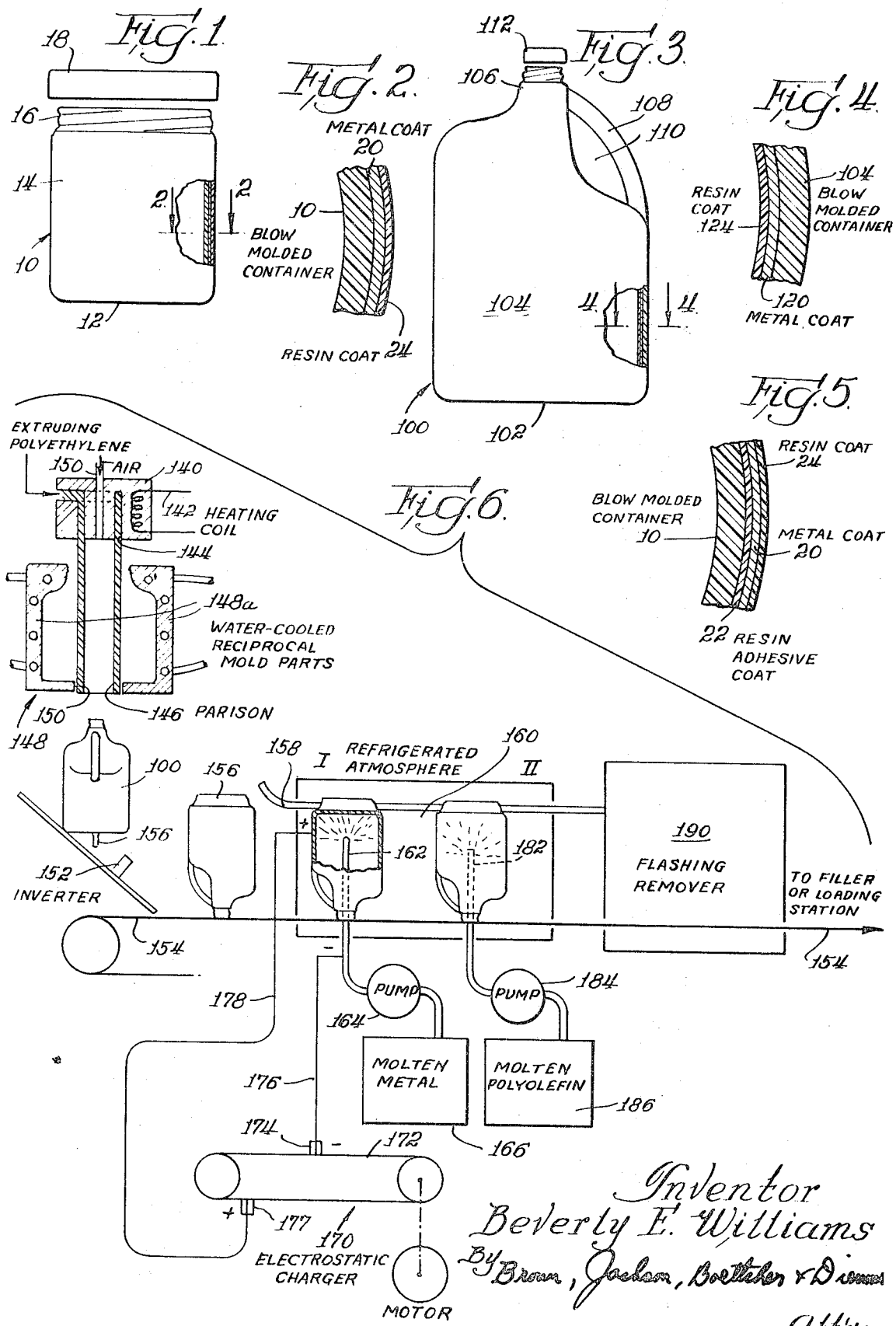

COATED PLASTIC CONTAINERS

This invention relates to containers, and method of manufacturing the same. The invention more particularly relates to improvements in containers of the type used for packaging liquids and semiliquids for the food, cosmetic and chemical trades.

The packaging industry has long been engaged in finding an inexpensive substitute for the glass bottles, jugs and jars which have been commonly used for containing liquids. Glass bottles, particularly in the larger sizes, are not only expensive to manufacture, but being heavy and susceptible to breakage are also difficult to handle. One alternative developed has been to fabricate the containers of fibreboard or other paperboard material which has been coated with wax or plastic to reduce its moisture permeability. Containers formed of coated paperboard, however, are only a partial solution to the problem. They can be mass produced at a cost low enough to permit being used once and then thrown away to eliminate the problems of rehandling, cleaning and sterilizing for reuse. However, there are obvious limitations on the size and shape of containers to which the paperboard can be formed. Because the paperboard has to be folded to shape and portions lapped and adhesively joined there are problems of leakage through imperfectly formed seams. A particularly vexatious problem has been that of providing a satisfactory closure and to date difficulty in producing a satisfactory handle has contributed to the manipulating of filled cartons of the larger sizes.

More recently interest has been developed in manufacturing a light-weight, seamless container by extruding a heated parison of thermoplastic material into the cavity of releasable dies and blowing air into the parison causing it to conform to the cavital shape of the closed mold dies. This has opened the field wide for a variety of shapes, as well as sizes beyond that even considered practical in fabricating glass containers. So-called blow molded containers can be inexpensively fabricated wherefore they can be used once and then disposed of. Unlike glass containers, there is no problem of breakage and by selecting a particular design the blow-molded containers can be formed into shapes of great strength as well as size. Like glass containers, the handles can be molded into the container as an integral unit and by appropriately shaping the neck of the container it can be adapted for usably pouring the contents and/or can be closed by any of the means commonly employed for closing glass containers. The commonly used plastics in said blow-molding techniques are inert to many materials and is therefore adaptable to packaging a wide variety of liquids and semiliquids.

Like glass, and unlike paperboard, polyethylene and the other polyolefins used in blow-molding techniques have a low moisture vapor permeation rate. However, there molecular structure is such that they do possess a relatively high gas transmission characteristic and are susceptible to the passage of light and particularly ultraviolet radiations.

Thus liquids such as milk, cream and other dairy products, certain citric fruit juices such as orange juice, vitamin preparations or liquids containing the same cannot be safely stored in fluorescent lighted display cases or refrigerating units as is commonly the case today because of the detrimental effect which the ultraviolet light emitted by the fluorescent bulbs will have on milk, cream or other products stored in the polyethylene bottles or jugs.

Polyethylene is also not a deterrent to the passage of certain volatile flavors, essential oils and fragrances, wherefore blow-molded containers have not been particularly useful to date for packaging various materials such as concentrated syrups used by the soft drink industry, mayonnaise and various other aromatic foods and certain cosmetics.

A principal object of the present invention therefore is to provide novel and improved means and methods by which blow-molded containers can be rendered useful for protecting the contents thereof against the deleterious effects of light and air and to seal in and prevent the loss fragrances volatile flavors and essential oils, fragrances and the like which characterize liquids or semiliquids conventionally packaged in such containers.

A more specific object of the present invention is to provide a container having a coating or coatings which will have the desired effect of providing a barrier to the entrance of light and air and/or to seal the escape of volatile flavors, odors, essential oils, fragrances and the like.

In accordance with this invention such a coating comprises a continuous thickness of metal which is integrally united with one surface of the container and has a thickness to provide the necessary barrier both to the transmission of light and the transmission of volatiles through the container wall which will detrimentally affect the flavor, aroma and other characteristics of the packaged liquid or semiliquid.

Depending on the particular shape of the container, this thickness of metal may be applied either to the exterior or to the interior surface of the container by dipping and/or spraying a volatile vehicle containing the metal in particulate form. Under some circumstances the metal thickness may also be applied as a sheet or foil as by hot stamping or by using a heated roll and an appropriate adhesive the foil may also be united to the receiving surface.

Most satisfactory results are obtained, however, in terms of bond and uniform distribution of the metal when the metal is initially heated to its molten stage and sprayed onto a cooled surface of the container. This method is particularly useful when the metal coating is to be applied to the inner surface of the container.

In accordance with the invention, the metal coating is then coated with an outer layer of an inert synthetic resin, for example polyethylene or other polyolefin of which the container itself is formed.

Thus further features of the invention are that it provides a novel container and method of manufacturing the same which has both the necessary low moisture vapor permeability of glass and in addition has low permeability to harmful light radiations and volatiles which will detrimentally affect the flavor, taste and aroma of the packaged product, the container at the same time being relatively strong, sturdy and relatively unbreakable.

A further feature of the invention is that the containers are seamless so that there is no problem of leakage.

Still another feature of the invention is that all of the said advantages are obtained in a container that is also simple and economical to manufacture.

Other objects, advantages as well as features of the invention will be apparent from the following detailed description of the invention;

Referring therefore now first to the drawings:

FIG. 1 illustrates one form of the invention wherein a foil of aluminum or other metal has been applied to the outer surface of the jar and optionally covered with a coating of protective resin, a portion of the wall being cut away to illustrate the same;

FIG. 2 is a section taken through said cutaway portion to illustrate on a larger scale the constructional details of the container wall;

FIG. 3 illustrates a second embodiment of the invention wherein the metal coating has been applied to the interior surface of a container of nonregular shape and which coating is also covered with a thickness of polyolefin resin;

FIG. 4 is a section taken along lines 4—4 of FIG. 3 and illustrates on an enlarged scale the multilayer character of the container wall;

FIG. 5 is a sectional view taken through the wall of the container illustrated by FIG. 1 and shows a further modification of the invention; and FIG. 6 schematically illustrates one method and the apparatus employed in the manufacture of containers according to the present invention.

In accordance with the invention containers are formed into one piece, unitary seamless, thin-walled structures of desired shape such as illustrated at 10 in FIG. 1, and at 100 in FIG. 3, by first injection molding, extruding or otherwise forming a hollow tube or parison of thermoplastic materials such as polyvinyl chloride. Polyolefins such as polyethylene and polypropylene are also particularly useful. Then while the parison is in a heated plastic state a cold mold is closed thereabout to pinch the lower end of the parison and compressed air is admitted into the parison blowing or inflating it into conformity with the internal cavital shape of the closed mold parts, after which the mold parts are opened and the blow-molded article discharged. Such blow-molding technique is well known to the industry and any of the conventional blow-molding machines available to the industry may be employed for the purposes of this invention. Suitable apparatus are illustrated by U.S. Pat. Nos. 3,217,357 and 3,120,679 to which reference may be had, it being understood, of course, that such patents are here cited merely as representative of the known art and to illustrate apparatus which may be usefully employed to produce a container 10 or 100 in accordance with this invention.

Referring now to FIGS. 1 and 2, container 10 is seen to comprise a generally cylindrical seamless hollow member having a flat bottom wall 12 of generally circular shape integrally united to an upstanding cylindrical continuous wall 14 having an open top defined by an externally threaded neck 16 which has an outside diameter close to that of the upstanding cylindrical wall 14 of the container. Container 10 may therefore be classified as a wide-mouthed jar. Its open end is illustrated in FIG. 1 as closeable by a cap 18 having an internally threaded flange which threadedly connects with the externally threaded neck of the container. Said neck 16, upstanding wall 14 and bottom wall 12 of the container 10 are comprised of a thermoplastic resin such as polyvinylchloride, polyethylene, polypropylene or other polyolefin which has been blow-molded to the illustrated one-piece unitary seamless structure. Container 10 may also be formed of any other suitably inert thermoplastic material which is capable of being blown into the cavital shape of appropriate dies and will thereafter retain said blown shape when subjected to normal temperatures.

The mentioned polyolefins and polyvinylchloride conventionally utilized in blow-molding are well adapted when blow-molded into a container such as 10 for packaging a wide variety of liquids and semiliquids because of their chemical inertness. For example, polyethylene has a relatively low melting point of 220°–270° F. which renders it particularly adaptable for blow-molding seamless containers; at the same time polyethylene has low temperature toughness, good impact resistance and low moisture vapor permeability and water absorption at room temperature, as well as excellent electrical and chemical resistance properties. However, polyethylene, as well as the other mentioned thermoplastic resins commonly used in blow-molding processes are highly permeable to various gases and light radiations, particularly ultraviolet light, so that containers thereof have not been useful for storing various materials such as milk, cream and other dairy products which are detrimentally effected when stored under ultraviolet light or for storing soft drink syrups, certain cosmetics and the like which contain volatile flavors, essential oils and fragrances.

However, in accordance with this invention, it is proposed to overcome this deficiency by integrally uniting a uniform thickness of metal 20 on one surface thereof as the formed containers are discharged from the molds of the blow-mold apparatus which will act as a barrier to reduce the permeability of the container walls to light radiations, including ultraviolet and also render the containers useful to seal in various volatiles and/or flavoring agents comprising the liquids, semiliquids or other materials when stored within the containers. Examples of suitable metals with which container 10 may be coated include aluminum, tin, lead, gold, platinum or silver. The metal is applied as a continuous coating free of perforations and having a thickness dependent on the method of application employed and the extent of protection required.

For example, metal foil in a thickness of 0.0035 inches serves both as an effective barrier to the escape of volatiles and to the transmission of light radiations, including ultraviolet light. The metal may be usefully applied either in foil form or as a coating and to either the inner surface or to the outer surface of the container. For most satisfactory results the bottom wall 16, as well as the upstanding wall 14 and neck 16 of the container are covered thereby. Cap 18 is preferably also stamped out of aluminum or other suitable barrier metal, although it may also comprise polyolefin or other resin and suitably lined with the metal foil or coating. In this manner the contents of the container can be completely enclosed by a thickness of metal.

The metal coating 20 itself may be applied in conventional manner and immediately in line with the blow-molding apparatus. For example, the aluminum or other reflective metal employed may be applied in foil form with heat and pressure to one surface, preferably the exterior surface of the container, both over its bottom wall 12 and its upstanding wall 14. It may also comprise a powder or flakes which have been treated with a leafing agent such as stearic acid and suspended in an appropriate vehicle and the suspension applied by flowing, brushing or spraying onto the surfaces of the container. Also, the container itself may be dipped into a tank containing the suspension of metallic flakes. Where the container has a regular shape as does container 10, the metal coating 22 is conveniently applied to the exterior surface by wrapping the foil about the cylindrical wall 14 with the application of heat and slight pressure. Preferably, the outer surface of said container wall is preconditioned by heating. As illustrated by FIG. 5, the outer surface of the container wall 14 also may be first coated with a suitable adhesive by which the metal foil may be bonded to the thermoplastic resin comprising the container wall. For example, the container wall may be first coated with an aqueous emulsion of polyethylene or other resins compatible with the material of the container wall 14 and heat applied after or simultaneously as the metal foil is tightly wrapped thereabout. Also, a thin coating of molten polyethylene may be applied to the outer surface of the container wall 14 and followed by tightly wrapping the aluminum or other metal foil about the coated container wall so that on cooling of the molten polyethylene the aluminum foil tightly unites to the container wall. Under some circumstances, the aluminum foil may be applied only to the container wall 14 and the containers then dipped into a solution of metal particles as above-described to coat the exterior of the bottom wall of the container. In such instances, if the container is dipped deep enough so that the lower edge portion of the aluminum foil about the upstanding wall of the container is also coated, a very effective barrier to light transmission and permeability of volatiles is obtained. Also, under some circumstances, coating of the bottom wall of the container may be omitted. For example, if the containers are to be used to package milk and are stored on opaque metal shelves with overhead fluorescent lighting, it may suffice if only the exposed sidewalls and top of the container are metal coated as described. Where the metal coating is to be applied to the interior of container 10, this is preferably obtained by a spray technique. It will be understood, of course, that the above described techniques of applying metal coatings are merely illustrative and any other suitable means and/or methods which will produce a continuous perforation-free strongly bonded continuous film of layer of metal bonded to the container wall may be employed.

Particularly where the metal coating 20 is applied to the interior surface of the container 10, an outer protective coating of a suitably inert resin is applied. When the metal coating is applied to the outer surface of the container wall, an outer coating of resin 24 will serve to protect the thin metal coating against possible abrasion and/or as a surface on which to print identifying or advertising legends. It is, however, also possible to directly print on the metal coating itself under some circumstances. Particularly where the metal coating comprises foil, it may be printed before application to the container wall surface.

The outer protective coating 24 preferably is of the same resin as that of which the container is blow-molded and should be nontoxic and inert to the contents which are to be packaged in the container. Polyvinylchloride or polyolefin such as the mentioned polyethylene or polypropylene are particularly useful to comprise coatings 24. These are conveniently available either as aqueous emulsions or as aquasols and are usually applied over the metal coating by conventional spraying, brushing or dipping techniques. They may also be applied in molten form. Actually, any of the conventionally available resins which have been approved for use in packaging foods may also be used. Examples thereof include bisphenol-formaldehyde, certain substituted phenol formaldehydes, phenol formaldehyde, urea formaldehyde, bisphenol-epichlorin and esters thereof, maleic anhydride, rosin ester, esterified Congo resin, esterified rosin, polyvinyl chloride and acetate, cellulose acetate, butyrate, polystyrene, polyvinyl butryal, petroleum hydrocarbon, vinylidine chloride, cellulose acetate, regenerated cellulose, butadiene-acrylonitrile copolymer, methyl and ethyl acetate, ethyl cellulose, rubber hydrochloride, ethylene terephthalate, ethyl isophthalate, butadiene-styrene copolymer, butadiene-acrylonitrile-styrene copolymer, terephathalic acid-ethylene glycol copolymer. Conventionally to obtain the described properties, such resins will be combined with an appropriate plasticizer. Examples of suitable plasticizers include acetyl tributyl citrate, acetyl triethyl citrate, butyl stearate, butyl phthalyl, butyl glycollate, p-tertiary butyl phenyl salicylate, dibutyl sebacate, di-iso butyl adipate, di-2-ethyl hexyl phthalate (for foods of high water content only), di-iso-octyl phthalate (for foods of high water content only), diethyl phthalate, 2-ethyl hexyl diphenyl phosphate, ethyl phthalyl ethyl glycollate, glyceryl monoleate, glycerin triacelate, monoisopropyl citrate, stearyl citrate, paraplex G-60, paraplex G-62, triethyl citrate and 3-(2-xenoxyl)-1,2-epoxipropene. Preferably coating 24 will also be provided in line so as to immediately follow the metal coating step and/or the drying step which follows application of the metal coating if that is required.

In FIGS. 3 and 4, a second embodiment of the invention is illustrated as comprising a blow-molded container 100, the upstanding wall of which has been reshaped to permit the formation of an integral unitary handle during the blow-molding. As illustrated in FIG. 3, said container 100 has a flat bottom wall 102 of generally circular shape, although it may also be square, triangular, rectangular and/or provided with rounded corners, for example. Bottom wall 102 integrally unites with an upstanding continuous wall 104 terminating in an open ended neck 106 of considerably reduced cross section. Upstanding wall 104 is noncylindrical in shape and has the upper portion of one side somewhat inwardly turned, providing space 108 therebetween and an integral handle 110 for convenient grasp of the handle. The container 100 has been blow-molded to the thus illustrated and described shape so that it comprises a unitary one-piece seamless structure and may be classified as a jug.

Its reduced neck 106 preferably has an internal diameter of about 0.935 inches which has been found to be a convenient size for pouring gallon and larger sized jugs. Its open end is illustrated as closeable by a cap 12 which may have an internally threaded flange for threading connection with externally located threads on neck 106. The open end of neck 106, however, may also be closed by a stopple, a plug, a friction cap or any other type of closure commonly known and conventionally utilized to close narrow neck glass jugs.

As illustrated by FIG. 4, the interior surface of the container 100, including its bottom wall 102, sidewall 104 and neck 106 are integrally united to an imperforate continuous coating 120 of metal such as aluminum, lead, tin, silver, gold, platinum and the like, and which is covered by a continuous imperforate overlying protective coating 124 of a suitably inert, nontoxic thermoplastic or thermosetting resin. The resin comprising coating 124 may be any one of the resins previously described as comprising coating 24 of the first embodiment. Preferably, however, coating 124 will comprise one of the mentioned polyolefins, polyethylene and polypropylene, or polyvinylchloride and of the same resin composition as comprises the container wall itself. Because of the irregular shape of the upstanding wall 104, it is difficult to satisfactorily unite a metal foil to either the interior or exterior surface thereof as described above in connection with the more regularly shaped cylindrical container 10. Container 100 is therefore more conveniently coated by utilizing either a spraying, brushing or dipping technique. For example, both the metal coating 120 and resin coating 124 can be applied to the inside or outside surface of container 100 using a spray technique such as previously described above in connection with the FIG. 1 embodiment, or can be applied to the exterior by dipping the container into a bath comprising a suspension of the particles.

However, a preferred method of manufacturing container 100 and coating its interior surface is illustrated by FIG. 6. Referring to said FIG. 6, polyethylene in a molten stage is fed through an extruder 140 heated to 160° C. by elements 142 and out its annular forming orifice 144 to produce a tubular shaped extrusion or parison 146 of polyethylene. In place of polyethylene, any other thermoplastic material conventionally used in blow-molding techniques may also be employed. Immediately beneath extruder 140 is a split cavital mold 148 having water cooled reciprocal mold parts 148a. Said mold parts 148a close around the parison 146 as it is extruded through aperture 144 to sever the parison from the extruding polyethylene and to cause its bottom edge 150 to constrict or otherwise pinch the lower parison in order to close the same. Compressed air is simultaneously admitted into the interior of the now one-end closed parison 146 to expand or inflate the heated walls of the parison against the surface of the mold 148 which simultaneously cools and sets the expanded parison into the form of container 100. As the mold parts 148a thereafter separate, the blow-molded container 100 drops therefrom onto an incline having associated means 152 by which it is deposited in an inverted position onto an intermittently driven conveyor belt 154. As parts 150 of mold parts 148 pinch the lower end of the parison 146 to close the same, they produce a flashing 156 which protrudes from the bottom wall 102 of the container. This flashing 156 together with other flashing formed at the junctures of the closed mold parts 148a during the expansion of the parison 146 within the mold may be immediately removed by an abrasive or cutting action. However, said flashing 156 may also be utilized as means by which space guides 158 arranged in parallel spaced relation above the conveyor belt 154 serve to hold the inverted container 100 in an upright stable position as the conveyor belt moves the container through the succeeding operations to which the containers are next subjected.

At 160 is a refrigerated chamber into which the inverted containers 100 are intermittently moved by conveyor belt 154. Said refrigerated chamber 160 comprises two coating stations identified as I and II. Each of said stations is provided with a vertically reciprocating spray jet synchronized with the intermittent movement of the conveyor belt 154 so as to rise into the interior of each container when the container is aligned thereover by the guides 158 and then to be retracted therefrom before the conveyor belt is again started up.

Spray jet 162 of coating station I connects via pump 164 to a charge of molten metal which has been heated to a temperature above its melting point, for example to about 600° C. in the case of aluminum. Operation of pump 164 is synchronized with the reciprocation of spray jet 162 such that as the jet rises in the interior of an aligned container 100 a charge of the molten metal in molecular form is discharged into the interior of the aligned container 100 so as to impinge against and plate its interior walls with a continuous metal coating which integrally unites or bonds to the container wall. The container walls are suitably chilled by the refrigerated atmosphere of chamber 160 in which the two coating stations are located so as to prevent deformation of the thermoplastic material of said walls under the heat of the impinging molecular metal particles. A static electric generator, as indicated at 170, may be associated with coating station I so as to place a positive electrosetting charge on the container wall to aid in attracting the negatively charged metal particles to said walls in order to build up a uniform plating thereof. As illustrated in FIG. 6, plus and minus electrostatic charges may be generated by a driving rubber belt 170 of the mentioned static electric charger 172 at high speed and utilizing a nylon or conductive copper brush 174 connecting by leads 176 to spray jet 162 to negatively charge the spray of metal particles. The positive charge may be pulled off the belt by means of brush 177 brushing under the side thereof and connected by a lead 178 to contact 180 brushing against the outer surface of the container positioned in coating station I.

The inverted position of the container in the coating station is useful in that it facilitates the depositing of the excess particles not attracted to the bottom wall and upstanding wall of the container against which the spray charge is directed so that these particles are deposited on the tapered wall of the container about the reduced neck to further enforce the continuity of the applied metal coating with which the interior of the container is plated.

On retraction of spray jet 162 from the container, the conveyor belt starts up so as to move the container to coating station II where spray jet 182 is raised into the interior of the container now aligned therewith. As illustrated in FIG. 6, spray jet 182 connects by a pump 184 to a charge 186 of olefin resin such as polyethylene which is heated to the neighborhood of 200° to 300° C. Operation of pump 182 is also synchronized with the reciprocation of the spray jet 182 and the momentary stopping of the conveyor belt in order that it will discharge a spray of the molten polyethylene resin particles onto the previously applied metal plated surface of the aligned container. Again, the refrigerated atmosphere of chamber 160 serves to prevent the thermoplastic wall of the container from deforming or changing shape under the heat of the impinging molten resin particles.

In place of a refrigerated atmosphere as provided by chamber 160, any other means of maintaining the containers in a sufficiently cooled state to avoid distortion by heat of the molten metal or molten polyolefin charges may be utilized. For example the containers may be sprayed by said charges while they are standing or partially immersed in cold brine. In such instances, however, the containers 100 would be in a more normal upright position, rather than in the inverted positions illustrated by FIG. 6.

As spray jet 182 retracts from the container through the conveyor belt, the conveyor belt 154 again starts up to carry the container out of the refrigerating chamber 160 and to conventional flash removing equipment indicated generally at 190 from which the containers are either reinverted and fed to a filling station (not illustrated) to be filled with a measured charge of liquid, for example milk, and capped, or alternatively to an unloading station where the containers are packaged in cartons for storage and/or future delivery to a filling operation.

It will also be understood that jets 162 and 182 may be used to coat the interior surface of such containers with a metal particle suspension for an aquasol or an aqueous emulsion of the resin as previously discussed in connection with coating containers 10. In such instances, refrigerated chamber 160 may be dispensed with or replaced by heating chamber which will accelerate the evaporation of the vehicle in which the resin and/or metal particles are suspended. However, where the interior surface of the containers are metal plated, in accordance with the method illustrated by FIG. 6 and described above, the brilliance of the plated metal through the more translucent polyethylene walls of the containers may be relied upon to produce a particularly attractive package. For example, where the containers are to be used to store cosmetics, plating of the interior of the container with a precious metal such as silver, gold or platinum, will not only provide the container with desired protection against the escape of volatiles and entrance of ultraviolet radiations, but will also provide a distinctive and unusual appearing container. Such can be further enhanced by utilizing an odd shaped container. As noted above, the irregular shaped interior of containers are easily coated in accordance with the method illustrated by FIG. 6.

Also, a die or pigment may be incorporated either in the thermoplastic material of which the containers 10 or 100 are blow-molded and/or the resin comprising the outer protective coatings 24 or 124. For example, it has been found that a colorant in the dark red or brown region of the spectrum has a deterent effect on the passage of ultraviolet radiations. Any of the edible vegetable coloring materials or other colorants approved by the Food and Drug Administration or Meat Inspection Division of the Department of Agriculture and which are nontoxic and otherwise safe for packaging of food products may be used.

It will also be understood that the aforedescribed containers are not to be considered in a limiting sense, but only as exemplary of containers which can be coated in accordance with the invention to have the desired light radiation and gaseous deterent characteristics. In fact, any of the numerous shapes of containers which the industry has been able to produce through blow-molding techniques will also find their place in this invention.

In addition it will be understood that many other variations, changes and/or modifications of the described process and method of manufacturing containers may be had within the spirit of the invention, the metes and bounds of which are defined by the appended claims.

Also, from the above description of the invention, it will be apparent that all of the recited objects, advantages and features thereof have been demonstrated as obtainable in a convenient and highly practical manner.

I claim:

1. A coated plastic bottle or jug useful for storing fluids which are deleteriously affected by light radiations or the escape of volatiles, comprising a hollow unitary thin-walled seamless member of thermoplastic resin having an integrally united flat bottom and upstanding continuous sidewall coated on one surface thereof with an overall continuous thickness of metal which reflects said light radiations and is impervious to said volatiles, and a thin continuous layer of nontoxic polyolefin resin overlying and bonded to said metal-coated surface, said polyolefin resin being inert in its effect on and in the presence of said fluid.

2. A coated plastic bottle or jug as claimed in claim 1 wherein the thickness of metal is a continuous coating of aluminum applied to the interior surface of the hollow member and the overlying thin continuous layer is polyethylene.

3. A coated plastic bottle or jug useful for storing fluids containing aromatic agents which are deleteriously effected by light radiations comprising a unitary, thin-walled hollow member of thermoplastic resin having integrally united flat bottom continuous sidewalls and neck coated on their inner surface with a thin continuous layer of nontoxic edible colorant in the red-brown spectrum and having a thin continuous layer of polyolefin resin overlying and bonded to said colorant coated surface.

4. A coated plastic bottle or jug according to claim 3, having a thickness of light reflective metal between the colorant and the overlying layer which is of polyethylene.

5. A coated plastic bottle or jug according to claim 3, having a continuous layer of aluminum metal about the exterior surface of the hollow member.

6. A coated plastic bottle or jug useful for storing fluids containing aromatic agents which are deleteriously effected by light radiations, comprising a blow-molded, unitary thin-walled hollow member of thermoplastic resin containing an edible vegetable dye producing a color in the red-brown end of the spectrum, and a thin continuous layer of light reflective metal covering one surface thereof.

7. A coated plastic bottle or jug according to claim 6, further having a thin continuous layer of nontoxic synthetic resin overlying and bonded to said metal-coated surface, said resin being inert in its effect on and in the presence of said fluid.

8. A coated plastic bottle or jug useful for storing fluids including liquids and semiliquids, comprising a blow-molded member of polyolefin resin having integrally united thin flat bottom and continuous sidewalls coated on one surface thereof with an impervious continuous thickness of metal, and a thin continuous layer of nontoxic polyolefin resin overlying and bonded to said metal-coated surface, said resin being inert in its effect on and in the presence of said fluid.